(12) United States Patent
Siyavudeen et al.

(10) Patent No.: US 11,882,164 B1
(45) Date of Patent: Jan. 23, 2024

(54) MINIMIZING WORK DISRUPTION WHEN INTEGRATING IP COMMUNICATION SYSTEMS WITH PUSH-TO-TALK SYSTEMS

(71) Applicant: Cisco Technology, Inc., San Jose, CA (US)

(72) Inventors: Faisal Siyavudeen, Kerala (IN); Sanjay Sinha, Bengaluru (IN); Adnan M. Agboatwalla, San Jose, CA (US); Irfan Shokat Shahdad, Allen, TX (US); Hakim Mehmood, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 225 days.

(21) Appl. No.: 16/992,581

(22) Filed: Aug. 13, 2020

(51) Int. Cl.
*H04L 65/4061* (2022.01)
*H04M 3/533* (2006.01)
*H04M 7/00* (2006.01)

(52) U.S. Cl.
CPC ...... *H04L 65/4061* (2013.01); *H04M 3/5335* (2013.01); *H04M 7/006* (2013.01)

(58) Field of Classification Search
CPC .. H04L 65/4061; H04M 3/5335; H04M 7/006
See application file for complete search history.

(56) References Cited

U.S. PATENT DOCUMENTS

| | | | |
|---|---|---|---|
| 5,841,854 A | 11/1998 | Schumacher et al. | |
| 7,440,440 B1 * | 10/2008 | Abichandani | H04M 3/42212 370/389 |
| 7,983,199 B1 | 7/2011 | Nguyen et al. | |
| 8,363,812 B1 * | 1/2013 | Robbins | H04L 65/1076 379/211.01 |
| 8,582,733 B1 * | 11/2013 | Larson | H04M 3/42212 379/201.01 |
| 8,588,760 B2 | 11/2013 | Esseling | |
| 8,855,054 B2 | 10/2014 | Otamendi et al. | |
| 10,257,669 B2 | 4/2019 | Patel et al. | |
| 10,587,753 B1 * | 3/2020 | Ravichandran | H04N 21/44016 |
| 11,005,988 B1 * | 5/2021 | Patakokila | H04M 1/82 |
| 11,012,562 B1 * | 5/2021 | Walton | H04M 3/42221 |

(Continued)

OTHER PUBLICATIONS

Sprint, "Sprint Direct Connect Plus™ Push-to-talk", 13 pages, retrieved from Internet Aug. 13, 2020; https://business.sprint.com/solutions/direct-connect-ptt/.

(Continued)

*Primary Examiner* — Khaled M Kassim
(74) *Attorney, Agent, or Firm* — Edell, Shapiro & Finnan, LLC

(57) ABSTRACT

One or more Push-To-Talk (PTT) processing devices of an Internet Protocol (IP) communication system receive an indication that a telephone call has been parked in the IP communication system. The one or more PTT processing devices determine the location of one or more PTT users of the IP communication system. The one or more PTT processing devices generate a first PTT channel based upon location of the one or more PTT users. The first PTT channel includes a first subset of the one or more PTT users. The one or more PTT processing devices transmit a first PTT audio notification that the telephone call is parked in the IP communication system to the first PTT channel.

20 Claims, 6 Drawing Sheets

(56) References Cited

U.S. PATENT DOCUMENTS

| | | | | |
|---|---|---|---|---|
| 2003/0227540 A1* | 12/2003 | Monroe | ........... | G08B 13/19645 |
| | | | | 348/E7.086 |
| 2004/0240656 A1* | 12/2004 | Poustchi | ............... | H04M 3/428 |
| | | | | 379/266.01 |
| 2006/0046759 A1* | 3/2006 | Yoon | ..................... | H04W 4/029 |
| | | | | 455/518 |
| 2006/0053010 A1* | 3/2006 | Chapman | ............... | H04L 63/306 |
| | | | | 704/235 |
| 2006/0221968 A1* | 10/2006 | Razdan | ................. | H04L 12/189 |
| | | | | 370/352 |
| 2007/0266077 A1 | 11/2007 | Wengrovitz | | |
| 2008/0056466 A1* | 3/2008 | Nishimura | ............ | H04M 1/642 |
| | | | | 379/88.22 |
| 2009/0097633 A1* | 4/2009 | James, Jr. | .............. | H04M 3/428 |
| | | | | 379/215.01 |
| 2010/0216500 A1* | 8/2010 | Shatsky | .................. | H04W 4/10 |
| | | | | 455/518 |
| 2010/0302066 A1* | 12/2010 | Talty | ..................... | H04W 4/029 |
| | | | | 340/905 |
| 2011/0151917 A1* | 6/2011 | Mao | ..................... | H04L 65/4061 |
| | | | | 455/519 |
| 2016/0381526 A1* | 12/2016 | Allen | ..................... | H04W 76/45 |
| | | | | 709/203 |
| 2017/0099455 A1* | 4/2017 | Mazzarella | ............. | H04L 67/52 |
| 2018/0160277 A1* | 6/2018 | Patel | ....................... | H04W 4/08 |

OTHER PUBLICATIONS

Cisco, "Configure InformaCast Paging Server Cisco Unified Communications Manager (CUCM) 12.0", 7 pages, retrieved from Internet Aug. 13, 2020.

Cisco, "Solution Reference Network Design (SRND) for Cisco Instant Connect, Release 5.0(2)", Cisco Systems, Inc., Mar. 26, 2018, 134 pages.

* cited by examiner

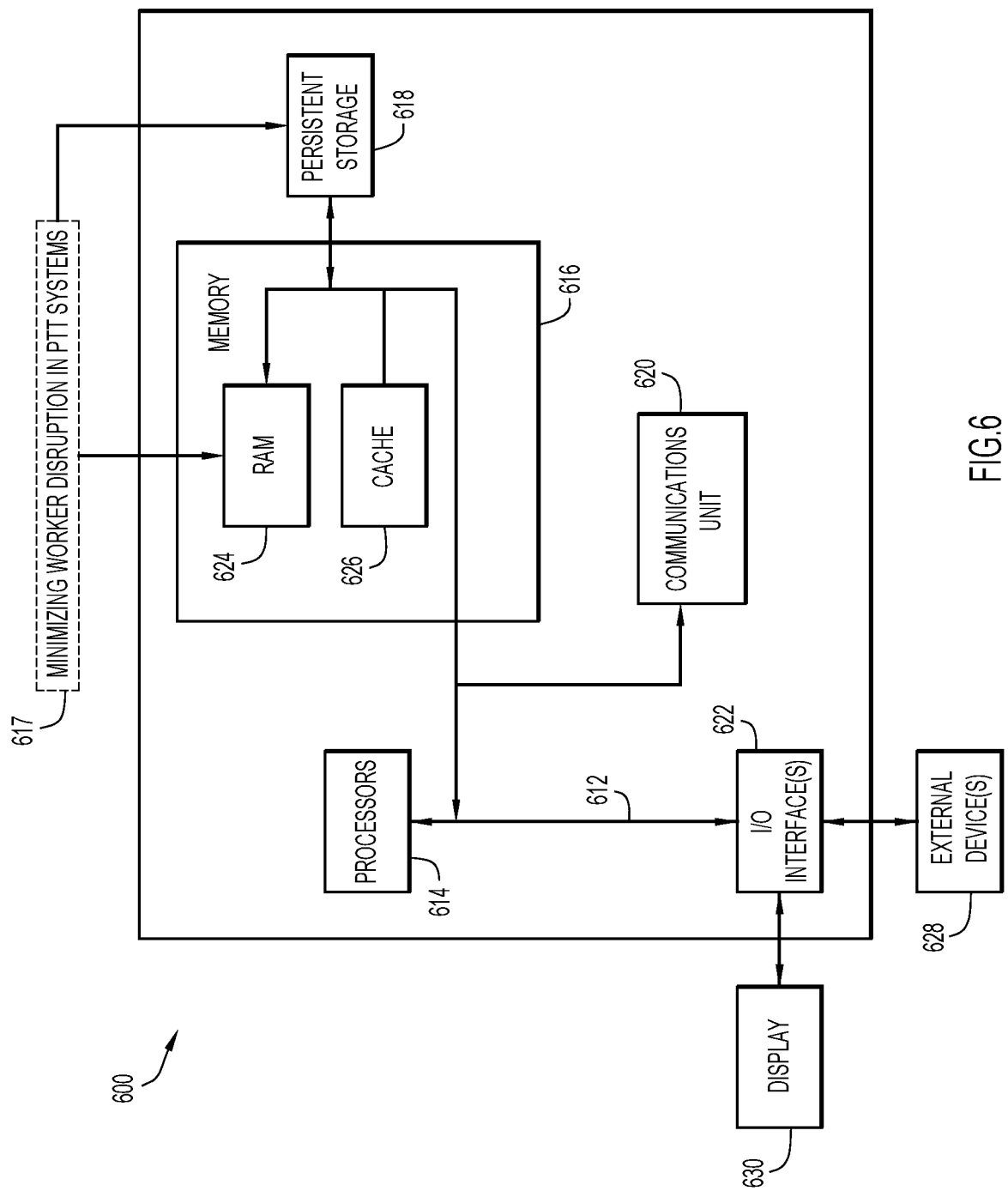

MINIMIZING WORK DISRUPTION WHEN INTEGRATING IP COMMUNICATION SYSTEMS WITH PUSH-TO-TALK SYSTEMS

TECHNICAL FIELD

The present disclosure relates to Internet Protocol (IP) based audio communication systems, and in particular, IP-based audio communication systems that are integrated with Push-to-Talk systems.

BACKGROUND

Many business operators in domains such as retail, hospitality, warehousing, manufacturing, and healthcare, among others, have deployed on-premises push-to-talk (PTT) systems. New enhanced Internet Protocol (IP) based PTT systems are emerging that have enhanced artificial intelligence capabilities. Existing integrations between IP-based communication systems (e.g., IP-based telephone systems) and IP-based PTT systems allow IP phones to act as PTT clients. PTT systems, when integrated with IP-based telephone systems may be used to notify PTT users of parked telephone calls using pre-existing PTT channels.

BRIEF DESCRIPTION OF THE DRAWINGS

FIG. 6 is a functional block diagram of a device configured to implement the PTT integration and work disruption minimization techniques of the present disclosure, according to example embodiments.

DESCRIPTION OF EXAMPLE EMBODIMENTS

Overview

According to example embodiments, one or more Push-To-Talk (PTT) processing devices of an Internet Protocol (IP) communication system receive an indication that a telephone call has been parked in the IP communication system. The one or more PTT processing devices determine the location of one or more PTT users of the IP communication system. The one or more PTT processing devices generate a first PTT channel based upon location of the one or more PTT users. The first PTT channel includes a first subset of the one or more PTT users. The one or more PTT processing devices transmit a first PTT audio notification that the telephone call is parked in the IP communication system to the first PTT channel.

Example Embodiments

Figure 1:
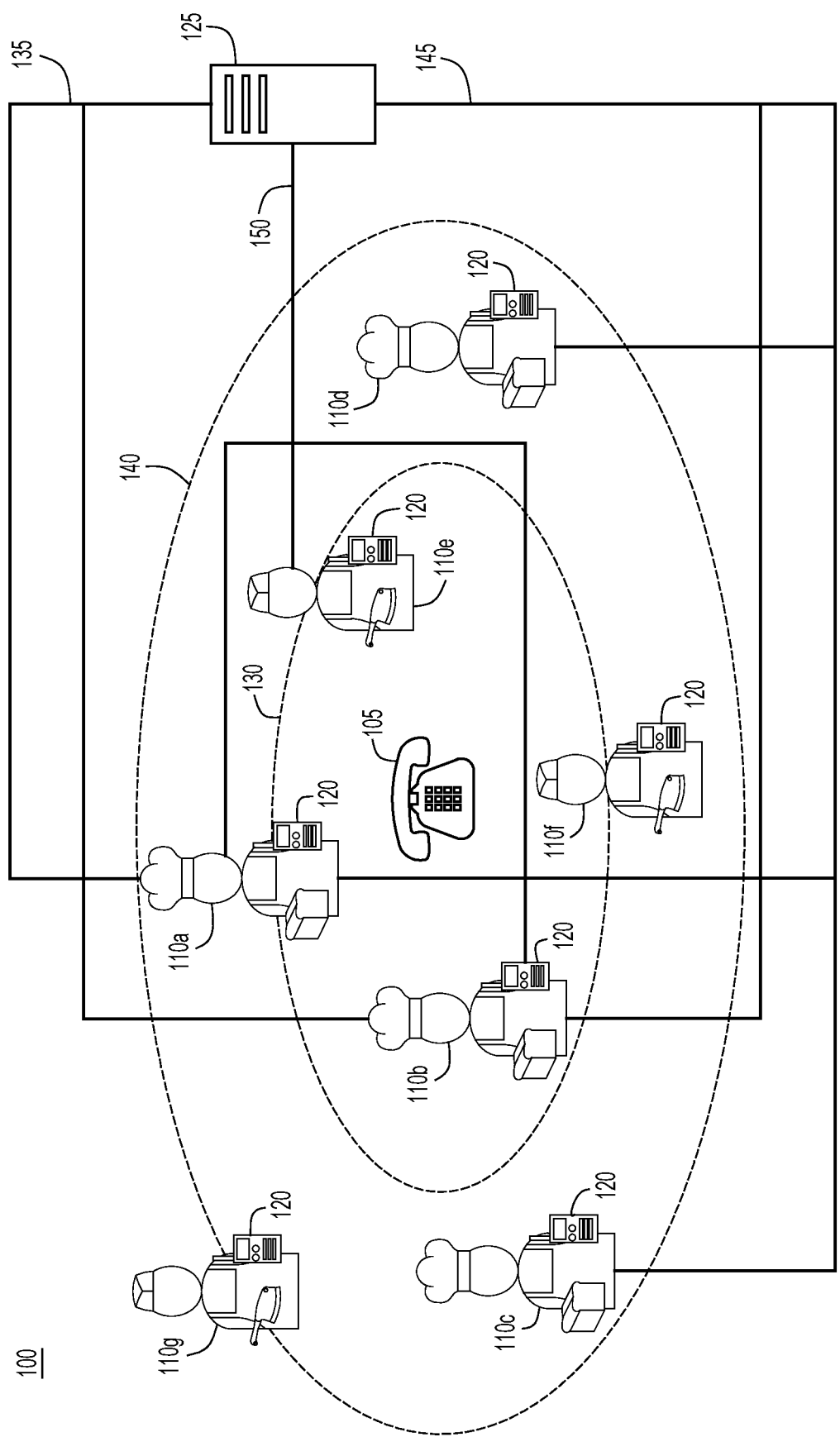
FIG. 1 is an illustration of a first IP communication environment configured to implement the PTT integration and work disruption minimization techniques of the present disclosure, according to example embodiments.

With reference now made to FIG. 1, depicted therein is an Internet Protocol (IP) communication environment 100 that will be used to describe the integration of Push-To-Talk (PTT) and IP-based communication systems of the present disclosure. Included in IP communication environment 100 are an endpoint device, telephone 105, and a plurality of PTT users 110*a-g*. Each of the PTT users 110*a-g* is equipped with a PTT client device 120. PTT client devices 120 may be embodied as IP-based phones with PTT functionality. According to other example embodiments, PTT client devices 120 are dedicated PTT devices. Also shown in FIG. 1 is a PTT processing service, which is illustrated as a single PTT processing device 125. PTT processing device 125 may be embodied as a customer premises and/or cloud-based communications system that provides for PTT functionality and/or services. For simplicity, FIG. 1 illustrates PTT processing device 125 as a single device, such as a single server device. The functionality described herein with respect to PTT processing device 125 may be executed as a service by one or more devices, including the system illustrated in detail in FIG. 3.

Consider the scenario where a company is running a series of retail stores. Each store has a PTT installation with different groups for each section of a store (bakery, butcher, plumbing, processed foods, security etc.). Staff of the stores carry PTT client devices 120 and are, therefore, PTT users. The PTT users are subscribed to one or more PTT groups depending on their job function. The company has one or more telephone or endpoint devices deployed in each store. When an external telephone call comes into a store, a basic auto-attendant may engage with the caller, find the nature of the caller's query using an interactive voice response (IVR) system, and route the call to an appropriate line. The telephones who have this line configured (e.g., telephone 105) would ring, and an employee near the telephone will answer the call. The employee determines that the call is related to a question for the bakery, which the employee is not fit to answer. The employee parks the call in IP communication environment 100. Upon the parking of the call, the IP communication environment 100 sends an automated message or notification to the bakery channel. The notification informs the PTT users associated with the bakery channel of the parked call and how to answer it. A PTT device user may then answer the call using any telephone device connected to IP communication environment 100. Other variations of this use-case are possible where the call is handled and parked directly by a receptionist or auto-attendant. It is also possible that the call is parked automatically when the initial call is not answered and a call forward no answer (CFNA) event is registered.

Additionally, IP communication environment 100 may park an incoming telephone call automatically on a channel that is specific to one or more PTT groups, once the nature of the call is determined (using a pre-configured or artificial intelligence (AI)-driven IVR, or using a full International Telecommunication Union Standardization Sector Recommendation E.164 mapping). The IP communication environment may then send a notification to the PTT service (e.g., PTT processing device 125) about the incoming call, a pick-up code that may be used to answer the telephone call, and information that may be used by the PTT service to determine target channel identifiers of the PTT client devices 120. The PTT service may convert the received notification to an audio message. Once the audio messages are created, the PTT service may perform one of the following actions.

First, the PTT service may broadcast the notification as an audio message to all the target channels. In this case, users who receive the notification will walk to the telephone and answer the call.

Second, the PTT service may broadcast the notification as an audio message to all target channels, but offer a way for a specific user to claim the call using a button push on the PTT client or by speaking a response that is broadcast on the target channels. This avoids the situation where multiple users attempt to pick up the call.

Third, the PTT service may compile the list of users in the target groups, identify the in-store location of each of the users (via an integration with an in-house location tracking system like Cisco DNA Spaces), find a small number of users who are near the telephones where the call can be answered, create a dynamic group for these users alone, and send the notification only to this dynamic group. The dynamic group can exclude users that are busy. This channel may be expanded over time if the call is not being picked up in a few seconds. Now, only the users who are near the telephones and belong to the correct target channel will attempt to claim the call. Users can claim the call using a PTT button or a voice message which is broadcast only to the dynamic group.

The above-described third option will now be described with reference to FIG. 1. Specifically, PTT processing device 125 is configured to notify PTT users 110a-g of a telephone call parked within IP communication environment 100 such that worker disruption may be minimized. Such techniques may include dynamically generating PTT channels through which a subset of PTT users 110a-g are notified of the telephone call, as well as techniques for notifying PTT users 110a-g of missed calls and voicemail messages to facilitate seamless call-backs to external users using voice commands from PTT client devices 120. The techniques of the present disclosure may also facilitate better placement of telephone 105 within IP communication environment 100 such that calls parked within IP communication environment 100 may be more efficiently fielded by PTT users 110a-g.

According to the specific example embodiment of FIG. 1, IP communication environment 100 is embodied as an IP communication environment for a grocery store in which PTT users 110a-g are assigned to different departments. Specifically, PTT users 110a-d are assigned to the bakery department and PTT users 110e-g are assigned to the butcher department. The IP communication environment 100 may store data indicative of this departmental assignment for each of PTT users 110a-g at PTT processing device 125. According to the techniques of the present disclosure, when a call is parked within IP communication environment 100, PTT processing device 125 will dynamically determine a PTT channel over which to notify a subset of PTT users 110a-g of the presence of the parked call. For example, telephone 105 may be a telephone located at the bakery department of the grocery store of IP communication environment 100. PTT processing device 125 may be configured with data indicating that telephone 105 is associated with the bakery department of IP communication environment 100, as well as the physical location of telephone 105. Accordingly, PTT processing device 125 may dynamically determine PTT channel 135 that includes PTT users 110a and 110b as the appropriate channel over which to notify a subset of PTT users 110a-g of the presence of the parked call.

More specifically, PTT channel 135 is dynamically selected based upon a plurality of criteria determined from data stored at PTT processing device 125. According to this specific example embodiment, PTT processing device 125 is aware of both the location and the departmental assignment of each of PTT users 110a-g. For example, each of PTT client devices 120 may contain a Global Position System (GPS) unit which sends a location of the PTT client devices 120 to PTT processing device 125. According to other example embodiments, PTT client devices 120 may be configured to connect to a Wi-Fi® wireless local area network of IP communication environment 100. Based on the strength of the connection between the PTT client devices 120 and the Wi-Fi access points, the location of each of the PTT client devices 120 may be determined, either by the PTT client devices 120 and transmitted to PTT processing device 125, or calculated by processing devices contained within IP communication environment 100. PTT processing device 125 may also determine the locations of PTT users 110a-g through integration with an in-house location tracking system like Cisco® DNA Spaces. Additional example embodiments may utilize Bluetooth low energy (BLE) systems to determine the location of PTT client devices 120. PTT processing device 125 may also store data indicative of whether or not one or more of PTT users 110a-g are busy. For example, whether or not a PTT user is busy may be derived from current PTT activity of the PTT client device 120 associated with the PTT user, posture information from wearables, or using policies that are specific to the enterprise application that the PTT user is currently using.

Based on the location information and departmental assignment data for PTT users 110a-g, and whether or not the PTT users 110a-g are busy, PTT processing device 125 dynamically generates PTT channel 135, selecting members of the bakery department who are within a geographical threshold 130 of telephone 105. In other words, PTT processing device 125 dynamically generates a PTT channel comprised of PTT users who are in the appropriate department (i.e., the bakery department) and who are currently located close to telephone 105, which in the case of FIG. 1 would be PTT users 110a and 110b.

According to other example embodiments, PTT processing device 125 may not contain data indicative of the location associated with PTT users 110a-g. Accordingly, PTT processing device 125 may dynamically generate PTT channel 145 which includes all PTT users within the bakery department, which would be PTT users 110a-d. According to still other example embodiments, PTT processing device 125 may include location data associated with PTT users 110a-g, but not contain departmental assignment data. According to such an example embodiment, PTT processing device 125 may dynamically generate PTT channel 150, which includes all PTT users within geographical threshold 130.

Once PTT processing device 125 generates the appropriate PTT channel, PTT processing device 125 generates a message to transmit over the generated PTT channel in order to notify the members of the PTT channel of the presence of the telephone call parked in IP communication environment 100. For example, PTT processing device 125 may generate an audio message, such as a voice message using a voice synthesizer (e.g., "There is a call waiting on the aisle phone, please pick up using code 8888"), for transmission over the generated PTT channel. The voice message may contain information informing the PTT users in the generated channel of the presence of the telephone call, the location of the telephone call, the intended recipient of the call, the purpose of the call, and/or other information that the skilled artisan would understand would be beneficial to provide to the PTT users who are expected to answer the telephone call.

If the call remains unanswered after the voice message is transmitted over the dynamically generated PTT channel, PTT processing device 125 may dynamically generate a new PTT channel with an expanded subset of PTT users 110a-g for transmission of a second PTT message. For example, if the telephone call goes unanswered after the initial voice message was transmitted over PTT channel 135 (containing PTT users 110a and 110b who are assigned to the bakery department and within geographical threshold 130), PTT processing device 125 may be configured to dynamically generate a new PTT channel to notify an expanded subset of PTT users 110a-g of the telephone call. For example, PTT processing device 125 may select a PTT channel that includes members of the bakery department who are within the expanded geographical threshold 140 surrounding telephone 105. According to such an example embodiment, PTT processing device 125 would dynamically generate PTT channel 145 that includes all members of the bakery department within geographical threshold 140, which includes PTT users 110a-d. According to other example embodiments, PTT processing device 125 may generate an expanded PTT channel that includes all PTT users within the smaller geographical threshold 130 regardless of the department to which the PTT users are assigned. Such a selection process would result in the selection of PTT users 110a and 110b of the bakery department, was well as PTT user 110e of the butcher department but who is located within geographical threshold 130. According to still other example embodiments, PTT processing device 125 may generate an expanded PTT channel that includes all PTT users 110a-g.

Regardless which expanded PTT channel is generated by PTT processing device 125, PTT processing device 125 will send a second PTT voice message to the expanded PTT channel. The second voice message may contain information analogous to that sent in the first voice message. The second voice message may also include additional information, such as how long the telephone call has been parked in IP communication environment 100 and/or an indication that the second PTT message is being sent to an expanded PTT channel in response to the telephone call going unanswered.

When a PTT user 110a-g receives a PTT voice message notifying him or her of the call (regardless of whether or not the PTT user has received the first or second PTT voice message), the PTT user may use his or her PTT client device 120 to answer the call or the PTT user may answer the call at telephone 105. When the PTT user answers the telephone call via his or her PTT client device 120, the PTT user may initiate answering the call through a button press or a voice message sent via his or her PTT client device 120. A voice PTT message sent from the PTT client device 120 may be received by PTT processing device 125. PTT processing device 125 may utilize an artificial intelligence (AI) voice system to process the response to the PTT user and connect the PTT user to the telephone call through PTT client device 120. Upon answer of the call by the PTT user, via either of telephone 105 or one of PTT client devices 120, PTT processing device 125 may send an additional PTT voice message to the members of the dynamically generated PTT channel to inform them that the call has been answered. For example, if the telephone call was answered by PTT user 110a in response to a PTT message sent to PTT channel 135, PTT processing device 125 may send a PTT voice message to PTT user 110b (the other member of PTT channel 135) to notify PTT user 110b that the telephone call has been answered so that PTT user 110b does not also attempt to answer the call.

If the telephone call is not picked up within a certain time, the IP communication environment 100 may log the incoming call and make the missed call information available to PTT users 110a-g. The call may also be redirected to voicemail. PTT users 110a-g may retrieve the details of missed calls and/or voicemails targeted to the group by speaking a specific command on an action channel in the group (e.g., "Retrieve missed calls", "Retrieve voicemails"etc.). PTT users 110a-g may then use another command (e.g., "Connect to caller") to initiate a call to the original caller. PTT processing device 125 may trigger the command to the IP communication system, which will place a call to the original caller and will connect the call to the store phone where the PTT user can answer the return call.

Figure 2:
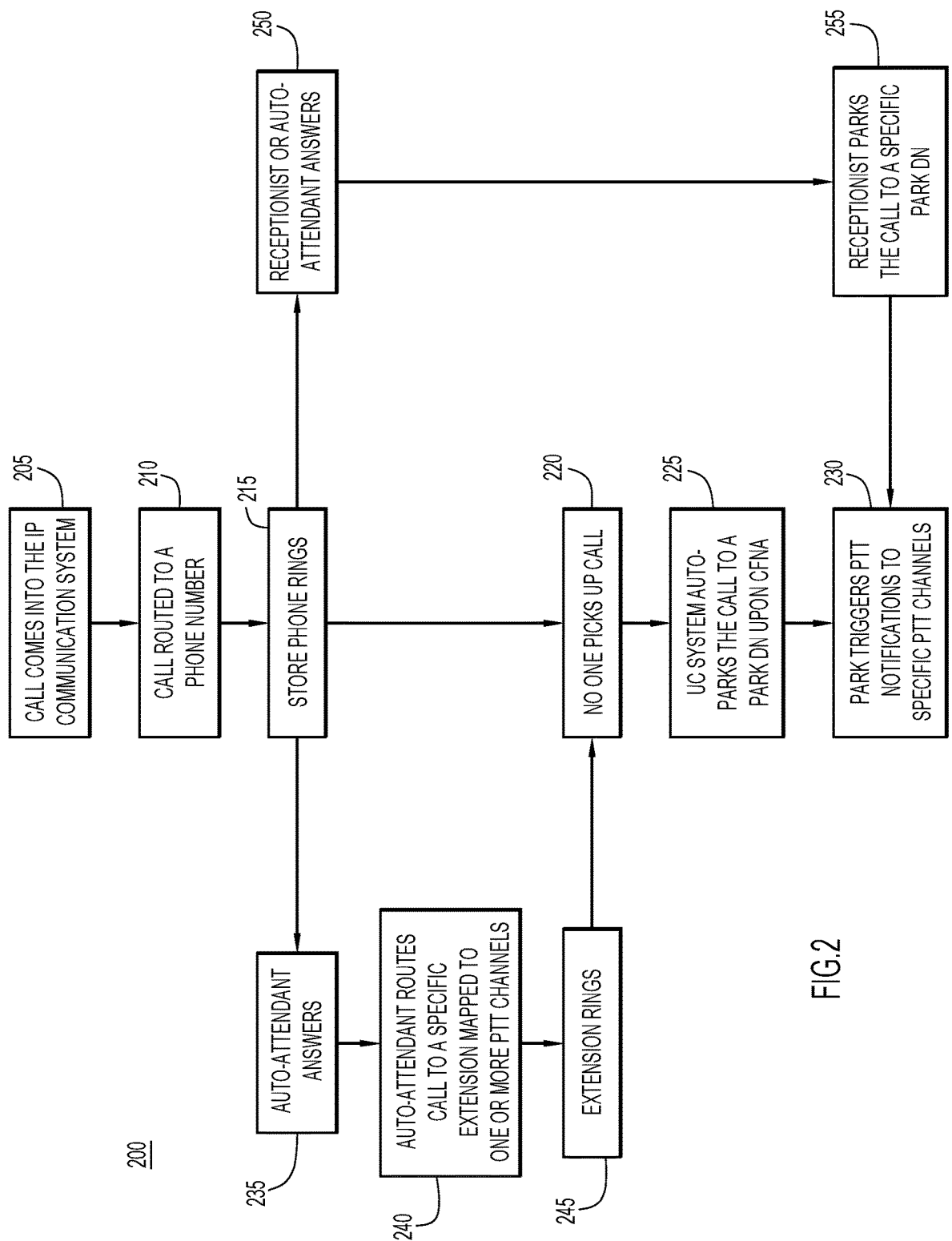
FIG. 2 is a flowchart illustrating a first process flow for implementing the PTT integration and work disruption minimization techniques of the present disclosure, according to example embodiments.

With reference now made to FIG. 2, depicted therein is a flowchart 200 illustrating a process flow according to the techniques of the present disclosure. The process of flowchart 200 begins in operation 205 where a call comes into an IP communication system, such as the IP communication system described with reference to FIG. 1, or as illustrated in detail in FIG. 3. The call is routed to a telephone number in operation 210, such as a store telephone as described above with reference to FIG. 1, and in operation 215 the telephone rings. At this point, flowchart 200 branches, though each branch will ultimately result in the notification of PTT users as described above with reference to FIG. 1.

According to the center branch of flowchart 200, the call goes unanswered in operation 220, which results in the IP communication system auto-parking the call to a park directory number (DN) upon a CFNA event within the system. In operation 230, the parking of the call triggers PTT notifications to the PTT users as described above with reference to FIG. 1, and as described below with reference to the flowchart of FIG. 4.

According to the left branch of flowchart 200, after the telephone rings in operation 215, an auto-attendant (i.e., an automated call answering system, such as an IVR system) answers the call in operation 235. In operation 240, the auto-attendant routes the call to a specific extension, such as telephone 105 of FIG. 1, which is mapped to one or more PTT channels. The extension rings in operation 245. If the call is not answered, operations 220, 225 and 230 are carried out as described above, with the parking of the call in operation 230 triggering PTT notifications to the PTT users as described above with reference to FIG. 1, and as described below with reference to the flowchart of FIG. 4.

According to the right branch of flowchart 200, after the telephone rings in operation 215, a receptionist or auto-attendant answers the call in operation 250. In operation 255, the receptionist or auto-attendant parks the call on a specific DN. The parking of the call in operation 230 triggers PTT notifications to the PTT users as described above with reference to FIG. 1, and as described below with reference to the flowchart of FIG. 4.

Figure 3:
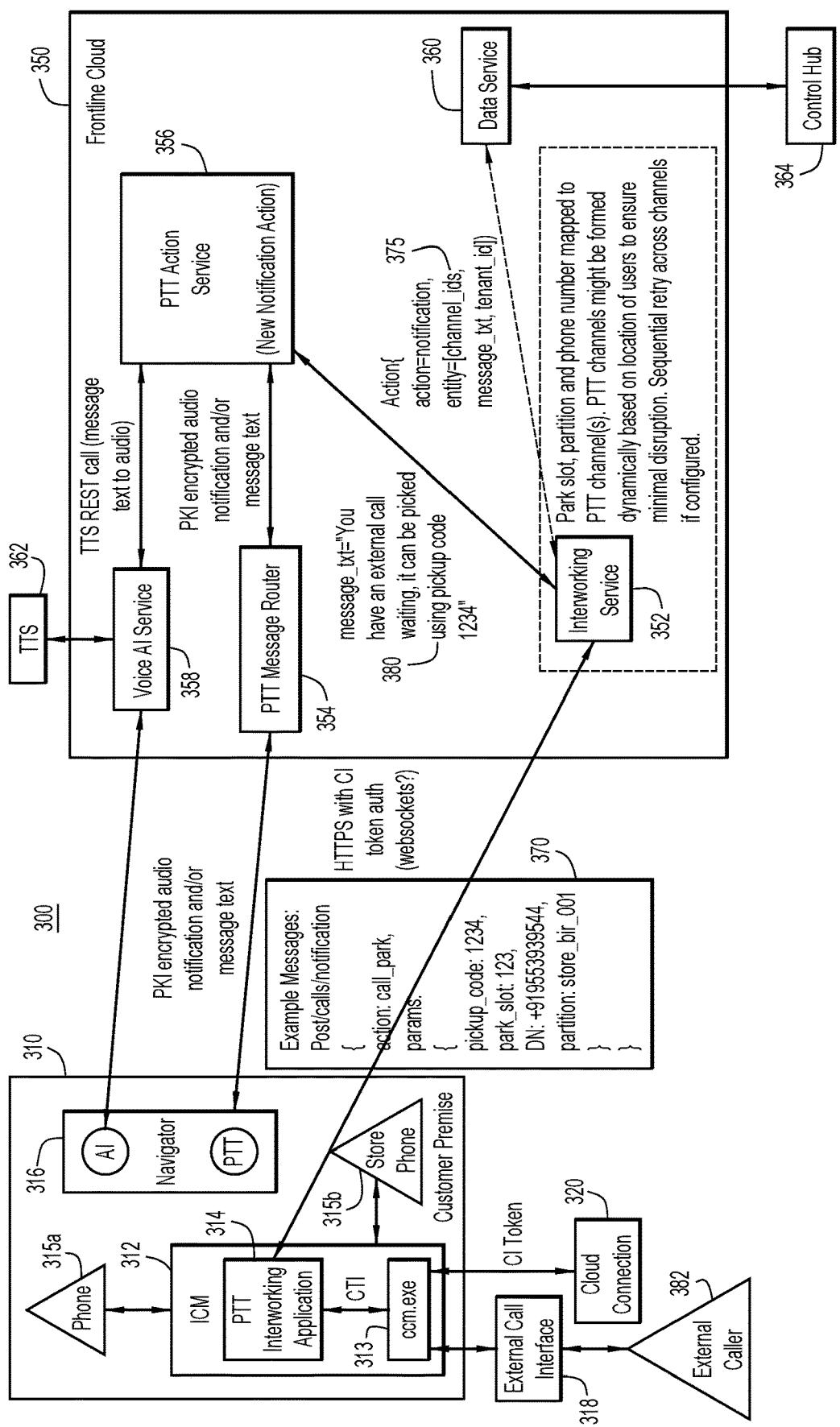
FIG. 3 is a functional block diagram of a network system configured to implement the PTT integration and work disruption minimization techniques of the present disclosure, according to example embodiments.

With reference now made to FIG. 3, depicted therein is an IP communication environment 300 that may be configured to carry out the techniques of the present disclosure. IP communication environment 300 includes a customer premises portion 310 and a cloud portion 350. Included in customer premises portion 310 are a call manager 312, telephones 315a and 315b, PTT client device 316, and an external call interface 318. Call manager 312 includes a call manager service 313 and PTT interworking application 314 that is configured to talk with a corresponding interworking service in cloud portion 350, interworking service 352. Customer premises portion 310 also has a connection to the cloud portion 350 through cloud connection 320. However, for ease of illustration, connections between the elements of cloud portion 350 are shown interfacing directly with the elements of customer premises portion 310 without passing through cloud connection 320.

Cloud portion 350 includes interworking service 352, a PTT message router 354, a PTT action service 356, a voice AI service 358, and a data service 360. Voice AI service 358 connects to Text to Speech (TTS) service 362, while data service 360 connects to control hub 364. Control hub 364 may serve as a browser based interface to configure parameters for service. 350. As will be described in detail below, a combination of elements of customer premises portion 310 and cloud portion 350 may be utilized to carry out the techniques of the present disclosure, including the functionality of PTT processing device 125 of FIG. 1.

According to the techniques of the present disclosure, when an external call is received from external telephone 382 via external call interface 318, the call manager service 313 of call manager 312 parks the call at telephone 315b. PTT interworking application 314 of the call manager 312 sends a message to the interworking service 352 of the cloud portion 350. This message may be sent securely using, for example, the Hypertext Transfer Protocol Secure (HTTPS) with token authentication through websockets. An example message is illustrated through the pseudo code of message 370, where it may be seen that the message indicates that a call has been parked ("action: call_park"), with message parameters describing a code with which the parked call may be picked up ("pickup_code 1234"), the slot in which the call is parked ("park_slot 123"), and the partition of the parked call ("partition: store_bit_001"). The above-listed information is non-exhaustive, and additional information may be included in message 370 without deviating from the concepts of the present disclosure. Interworking service 352 maps the park slot, partition and the DN to a PTT channel.

As described above with reference to FIG. 1, the PTT channel may be dynamically generated based on different criteria, including the location of PTT users within customer premises portion 310, the department or organizational group to which the PTT users are assigned, whether or not the PTT user is busy, and other criteria known to the skilled artisan. Interworking service 352 sends an action message 375 to PTT action service 356. Action message 375 indicates to PTT action service 356 that a notification action is to be performed ("action=notification") and the destination and content of the notification ("entity=[channel_id, message_txt, tenant_id]"). More specifically, action message 375 may indicate that a notification is to be sent over the dynamic channel generated by interworking service 352, as well as the message text of the notification is the message text 380 ("You have an external call waiting and it can be picked up using pickup code 1234"). PTT action service 356 is configured to send the message text of the notification to voice AI service 358, which receives the appropriate audio for the message text from TTS service 362. The audio for the notification message is then returned to PTT action service 356.

PTT action service 356 then transmits the audio message to PTT message router 354 as a Public Key Infrastructure (PKI) encrypted audio notification. PTT message router 354 then sends the PKI encrypted audio notification over the PTT channel generated by interworking service 352. For completeness, it is noted that a corresponding text message may be sent in conjunction with or in place of the audio message. When text is sent in place of the audio message, the above-described steps that utilize Voice AI service 358 and TTS service 362 may be omitted.

PTT Message Router routes the message to the PTT channel generated by interworking service 352, which is illustrated through the PKI encrypted audio notification (and/or message text) being sent to PTT client device 316.

If the call at telephone 315b is not answered in response to the message sent by PTT message router 354, PTT interworking application 314 of call manager 312 may send a subsequent message. Such a subsequent may contain data analogous to message 370 and may reinitiate the sending of a message indicating the parked call to an expanded PTT channel.

If, on the other hand, the user associated with PTT client device 316 intends to answer the call, the user will send a push-button or voice message indicating that the call is being answered. A voice message may be sent to Voice AI service 358, which will translate the audio message to text via TTS service 362. Based upon this text, cloud portion 350 and customer premises portion 310 will appropriately handle the call for acceptance by the user of PTT client device 316 by, for example, transferring the call to telephone 315b or PTT client device 316 in accordance with the audio message sent by PTT client device 316.

If the call goes unanswered and is redirected to voicemail, PTT users may retrieve the details of missed calls and/or voicemails targeted to the group by speaking a specific command on an action channel in the group (e.g., "Retrieve missed calls", "Retrieve voicemails" etc.). PTT users may also use another command (e.g., "Connect to caller") to initiate a call to the original caller. In response to such commands, PTT client device 316 will send the audio associated with these commands to voice AI service 358, which will use TTS service 362 to convert the audio commands to text. Based upon this text, cloud portion 350 and customer premises portion 310 will appropriately respond to the user's commands.

Figure 4:
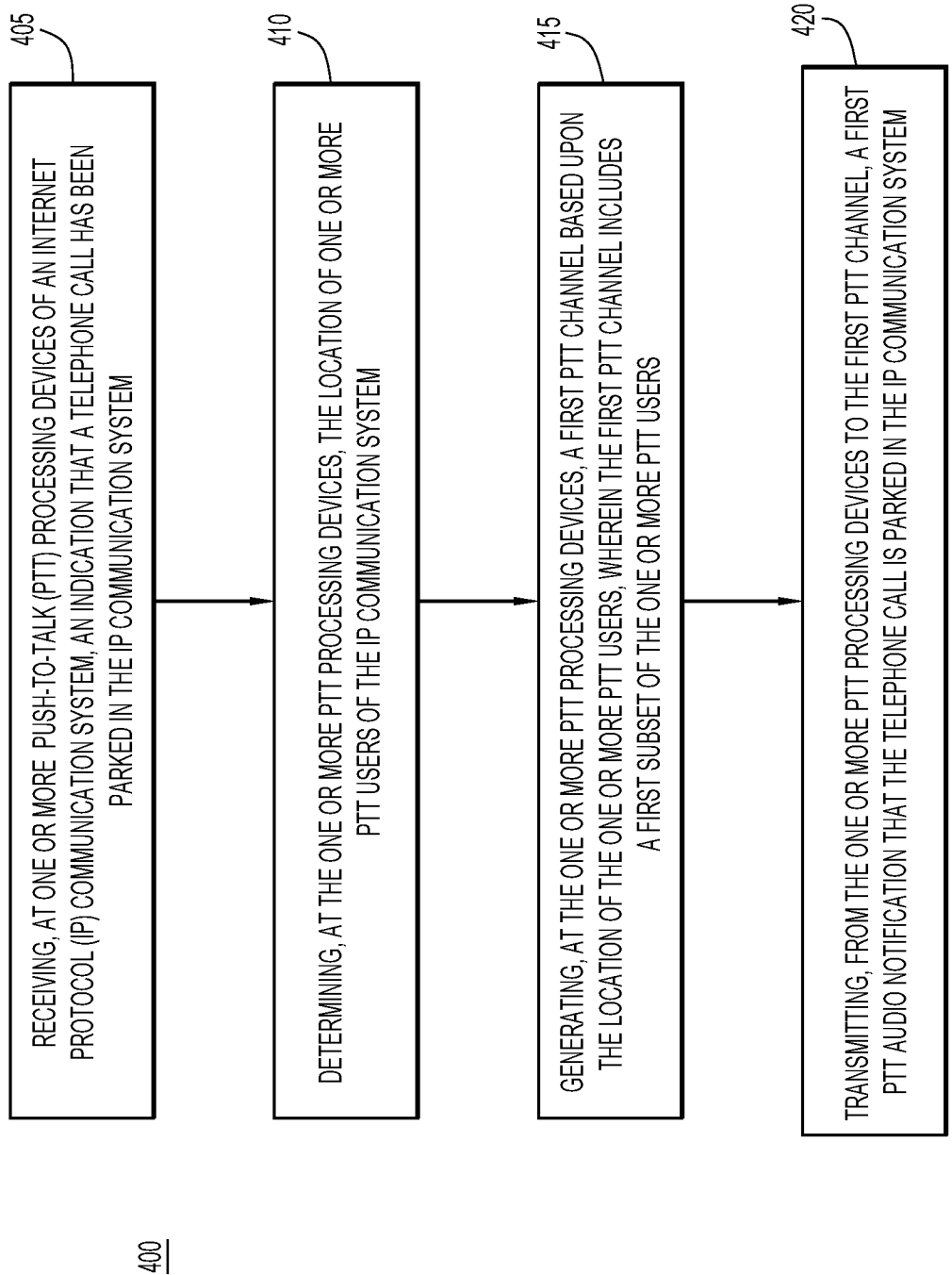
FIG. 4 is a flowchart illustrating a second process flow for implementing the PTT integration and work disruption minimization techniques of the present disclosure, according to example embodiments.

With reference now made to FIG. 4, depicted therein is a flowchart 400 illustrating an example process flow for the process carried out by PTT processing device 125 of FIG. 1 and/or cloud portion 350 of FIG. 3. The process of flowchart 400 begins in operation 405 in which an indication that a telephone call has been parked in an IP communication system is received by one or more PTT processing devices of the IP communication system. Operation 405 may be embodied as an indication sent to PTT processing device 125 that a call has been parked in IP communication environment 100 Operation 405 may also be embodied as the sending of message 370 as illustrated in FIG. 3.

In operation 410, the one or more PTT processing devices determine the location of one or more PTT users of the IP communication system. Operation 410 may be embodied as PTT processing device 125 determining the location or one or more of PTT users 110a-g of FIG. 1. Operation 410 may also be embodied as interworking service 352 determining the location of one or more of the PTT users within customer premises portion 310 of FIG. 3.

In operation 415, a first PTT channel is generated based upon the location of the one or more PTT users. According to the example embodiment of FIG. 4, the PTT channel includes a first subset of the PTT users. Operation 415 may be embodied as PTT processing device 125 generating one or more of PTT channels 135, 145 and/or 150. Operation 415 may also be embodied as interworking service 352 generating a PTT channel as illustrated of FIG. 3.

Finally, in operation 420 a first PTT audio notification is transmitted from the one or more PTT processing devices to the first PTT channel. The first PTT audio notification indicates that the telephone call is parked in the IP communication system. Operation 420 may be embodied as PTT processing device 125 sending notifications to one or more of PTT channels 135, 145 and/or 150. Operation 420 may also be embodied as PTT message router 354 sending PTT audio messages to PTT client device 316 as illustrated in FIG. 3.

The process flow of flowchart 400 may include more or fewer steps without deviating from the techniques of the present disclosure. For example, the operations illustrated in FIG. 3 that take place between the receipt of message 370 by interworking service 352 and the transmission of the audio notification by PTT message router 354 may also be included in the process flow of flowchart 400. The sending of messages to expanded PTT channels as described with reference to FIGS. 1 and 3 may also be included in the process flow of flowchart 400.

Figure 5:
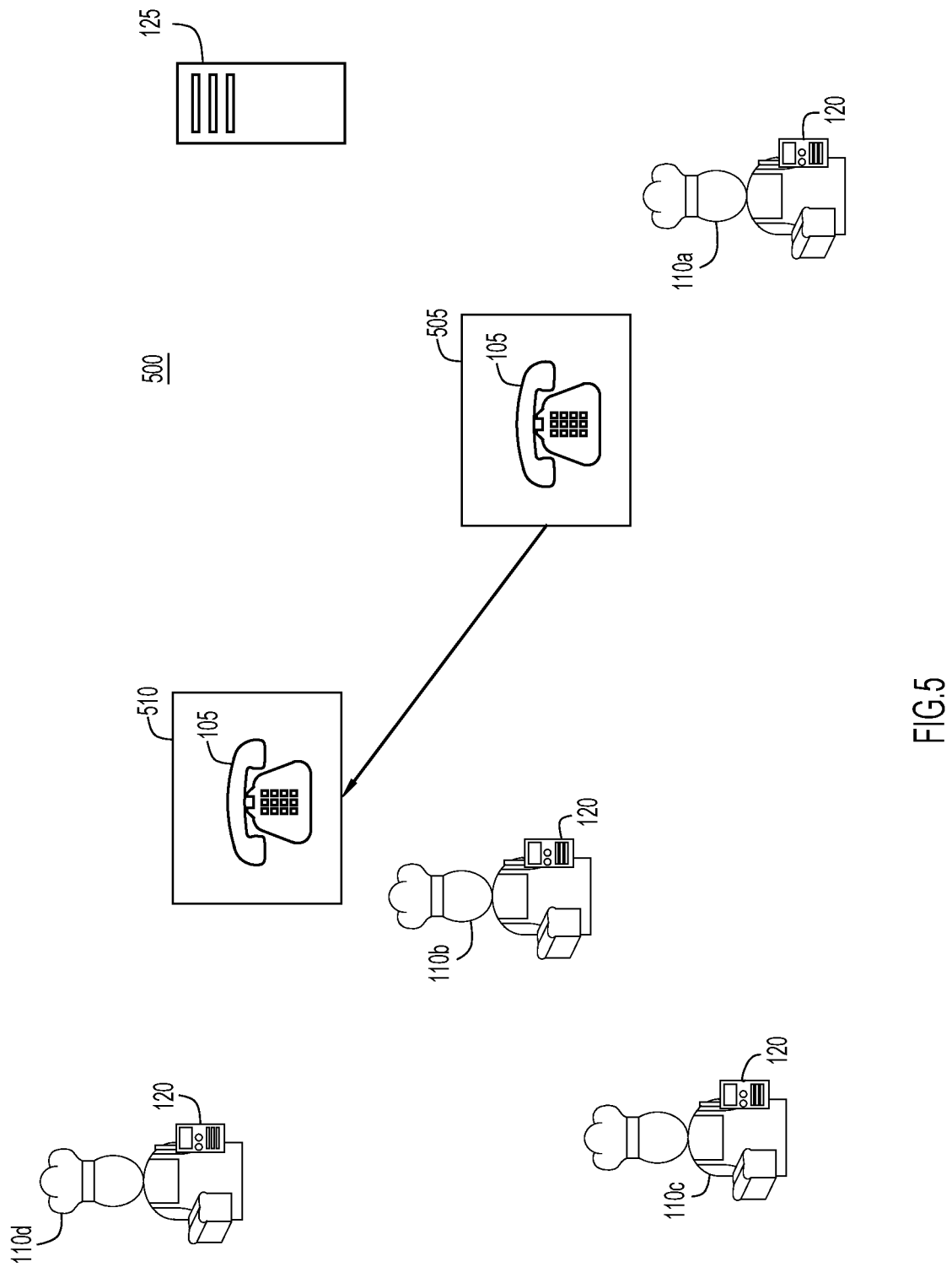
FIG. 5 is an illustration of a second IP communication environment configured to implement optimized telephone placement techniques of the present disclosure, according to example embodiments.

With reference now made to FIG. 5, illustrated therein is an IP communication environment 500 which functionally demonstrates how the techniques of the present disclosure may be employed to make telephone placement more efficient. Specifically, the data collected from the usage of systems described herein (e.g., the number of calls notified, time taken to pick up or call back, the percentage of calls dropped, initial locations of notified users and their paths after receiving notifications, and others known to the skilled artisan) may be used to provide insights on making telephone placement more effective in enterprise work environments.

As explained above with reference to FIG. 1, PTT processing device 125 may store data indicating a location of telephone 105 as well as PTT users 110*a-d*. As shown in FIG. 5, telephone 105 is the telephone for the bakery department, and PTT users 110*a-d* are the PTT user assigned to the bakery department. Telephone 105 is initially located at location 505, which is shown as located relatively close to only one of PTT users 110*a-d*, in this case, PTT user 110*a*. Because PTT processing device 125 may track, for example, the time it takes to answer a call after a notification, the initial locations of PTT users 110*a-d* when they are notified of a call, and their paths after receiving notifications, PTT processing device 125 may be configured to determine a more optimal location for telephone 105, such as location 510 which is in closer proximity to a greater number of PTT users 110*a-d*. According to specific example embodiments, PTT processing device 125 may be configured to determine locations for telephones that minimize or otherwise lessen the average distance that a PTT user 110*a-d* would travel to answer a call.

With reference now made to FIG. 6, depicted therein is a hardware block diagram of a computing device 600 that may perform the functions of any of the servers or computing entities referred to herein in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the Minimizing Worker Disruption in PTT Systems Software 617 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, techniques are provided for mapping an IP communication line to one or more PTT channel IDs; auto-parking a call to a telephone to an IP communication line mapped to a PTT channel; and notifying the PTT system about the parked call securely. The PTT system converts the notification received from the IP communication system to an audio message and selects channels to send messages based on the park slot, DN, and other characteristics of the incoming call. The PTT system selects channels/users to send the message to dynamically based on the location of users and the telephone obtained from a location tracking system.

An IP communication system sends notifications to the PTT system on call pickup and handling of those notifications. The IP communication system sends details of missed calls and voicemails to PTT system users. Voice commands and back-end logic in PTT systems are provided for replay of notifications, retrieving missed calls and voicemails from IP-based communication systems.

The PTT system triggers a call-back request to the IP-based communication system and the IP-based communication system connects external callers and IP-based communication system telephones. These techniques provide insights on improving telephone placement in IP-based communication environments based on location data, time taken to answer calls after notifications, numbers of calls missed, and other considerations known to the skilled artisan.

The techniques of the present disclosure provide for notifying PTT users of incoming calls in such a way that the disruption to these users' work may be lessened. The techniques involve parking the call on the IP communication side and then notifying users on the PTT side securely and selectively. The techniques also provide additional functionality to ensure better user productivity. The techniques of the present disclosure may include notifications such that multiple users belonging to a PTT channel are not disrupted by the call notification—a dynamic PTT sub-channel can be created from the main channel that contains only those users that are closest to the ringing telephone(s) and the notification can be sent to only this channel. Users can see and/or hear the notifications on the PTT client device and the techniques disclosed herein provide a mechanism to allow them to replay incoming call pickup information, thereby avoiding the need for repeated paging used in public address systems. The techniques also permit a PTT user to trigger if the call got disconnected before they could pick it up—they can review call details, check voice-mail, trigger call-back etc. for the missed calls, all using voice commands on their PTT device without having to use the phone controls. Using call completion data from IP communication systems and PTT systems, as well as location information of PTT users receiving call notifications, to improve telephone placement in enterprise environments (retail, hospitality, healthcare etc.) differentiates these techniques from a general call park/pickup solution.

In other words, according to the techniques of the present disclosure, external calls are parked to a customer premise telephone and PTT users are notified about the call. The techniques of the present disclosure enable the PTT service to notify users in the right PTT groups who are located near the phone so that the call can be picked up with minimal disruption. The techniques of the present disclosure also enable PTT users to obtain missed call and voicemail information and enable seamless call-backs to external callers using voice commands from PTT device.

Accordingly, provided for herein are methods and/or processes which include the following operations: receiving, at one or more Push-To-Talk (PTT) processing devices of an Internet Protocol (IP) communication system, an indication that a telephone call is parked in the IP communication system; determining, at the one or more PTT processing devices, the location of one or more PTT users of the IP communication system; generating, at the one or more PTT processing devices, a first PTT channel based upon the location of the one or more PTT users, wherein the first PTT channel includes a first subset of the one or more PTT users; and transmitting, from the one or more PTT processing devices to the first PTT channel, a first PTT audio notification that the telephone call is parked in the IP communication system.

Also provided for herein are apparatuses that include one or more memories, one or more network interfaces, and one or more processors. The one or more processors are configured to: receive, via the one or more network interfaces, an indication that a telephone call is parked in the IP communication system; determine, from data stored in the memory, the location of one or more PTT users of the IP communication system; generate a first PTT channel based upon the location of the one or more PTT users, wherein the first PTT channel includes a first subset of the one or more PTT users; and transmit, via the one or more network interfaces to the first PTT channel, a first PTT audio notification that the telephone call is parked in the IP communication system.

The techniques of the present disclosure also provide for one or more tangible, non-transitory computer readable mediums. The one or more computer readable mediums are encoded with instruction. Then executed by a processors, the instructions are operable to: receive, at one or more Push-To-Talk (PTT) processing devices of an Internet Protocol (IP) communication system, an indication that a telephone call is parked in the IP communication system; determine, at the one or more PTT processing devices, the location of one or more PTT users of the IP communication system; generate, at the one or more PTT processing devices, a first PTT channel based upon the location of the one or more PTT users, wherein the first PTT channel includes a first subset of the one or more PTT users; and transmit, from the one or more PTT processing devices to the first PTT channel, a first PTT audio notification that the telephone call is parked in the IP communication system.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining, at one or more Push-To-Talk (PTT) processing devices of an Internet Protocol (IP) communication system, an indication that a telephone call is parked in the IP communication system;
   determining, at the one or more PTT processing devices, a physical location of one or more PTT user client devices of the IP communication system;
   determining an organizational group of a user of each of the one or more PTT user client devices of the IP communication system;
   determining a first organizational group based upon the first organizational group being associated with where the telephone call is parked in the IP communication system;
   generating, at the one or more PTT processing devices, a first PTT channel based upon the physical location of the one or more PTT user client devices, wherein the first PTT channel includes a first subset of the one or more PTT user client devices that belong to the first organizational group;
   providing, from the one or more PTT processing devices to the first PTT channel, a first PTT audio notification that the telephone call is parked in the IP communication system;
   obtaining, at the one or more PTT processing devices, an indication that the telephone call has not been answered by a user of a user client device in the first subset of the one or more PTT user client devices;
   generating, at the one or more PTT processing devices, a second PTT channel based upon the physical location of the one or more PTT user client devices, wherein the second PTT channel includes a second subset of the one or more PTT user client devices that is different from the first subset of the one or more PTT user client devices; and providing, from the one or more PTT processing devices to the second PTT channel, a second PTT audio notification that the telephone call is parked in the IP communication system.

2. The method of claim 1, wherein generating the first PTT channel comprises generating the first PTT channel based on a physical location of an endpoint device configured to answer telephone calls parked in the IP communication system; and wherein generating the second PTT channel comprises selecting the second subset of the one or more PTT user client devices such that the second subset of the one or more PTT user client devices includes at least one PTT user client device whose physical location is further from the endpoint device than PTT user client devices of the first subset of the one or more PTT user client devices.

3. The method of claim 1, wherein:

at least one PTT user of a client device of the second subset of the one or more PTT user client devices is a member of a second organizational group of the IP communication system.

4. The method of claim 1, further comprising:

tracking telephone calls answered at an endpoint device of the IP communication system; and determining a new physical location for the endpoint device based upon the tracking.

5. The method of claim 4, wherein tracking telephone calls answered at the endpoint device comprises one or more of:

tracking the physical location of PTT user client devices of users who answer the telephone calls; and tracking times between PTT notifications of the telephone calls and answering of the telephone calls by the users.

6. The method of claim 1, further comprising:

obtaining, at the one or more PTT processing devices, an indication that the telephone call has not been answered by a user of a PTT client device in the first subset of the one or more PTT user client devices;

generating, at the one or more PTT processing devices, a second PTT audio notification; and providing the second PTT audio notification to the first PTT channel, wherein the second PTT audio notification comprises one or more of:

an indication that the telephone call was missed;

an indication that a voicemail message was created in response to the telephone call; or a replay of the first PTT audio notification.

7. The method of claim 1, further comprising determining a purpose of the telephone call, wherein generating the first PTT channel comprises generating the first PTT channel based on the purpose of the telephone call.

8. An apparatus comprising:

one or more memories;

one or more network interfaces; and one or more processors, wherein the one or more processors are configured to:

obtain, via the one or more network interfaces, an indication that a telephone call is parked in an Internet Protocol (IP) communication system;

determine, from first data stored in the one or more memories, a physical location of one or more Push-To-Talk (PTT) user client devices of the IP communication system;

determine, from second data stored in the one or more memories, an organizational group of a user of each of the one or more PTT user client devices of the IP communication system;

determine a first organizational group based upon the first organizational group being associated with where the telephone call is parked in the IP communication system;

generate a first PTT channel based upon the physical location of the one or more PTT user client devices , wherein the first PTT channel includes a first subset of the one or more PTT user client devices that belong to the first organizational group;

provide, via the one or more network interfaces to the first PTT channel, a first PTT audio notification that the telephone call is parked in the IP communication system;

obtain, via the one or more network interfaces, an indication that the telephone call has not been answered by a user of a PTT client device in the first subset of the one or more PTT user client devices;

generate a second PTT channel based upon the physical location of the one or more PTT user client devices, wherein the second PTT channel includes a second subset of the one or more PTT user client devices that is different from the first subset of the one or more PTT user client devices; and provide, via the one or more network interfaces to the second PTT channel, a second PTT audio notification that the telephone call is parked in the IP communication system.

9. The apparatus of claim 8, wherein the one or more processors are configured to generate the first PTT channel by generating the first PTT channel based on a physical location of an endpoint device configured to answer telephone calls parked in the IP communication system; and wherein the one or more processors are configured to generate the second PTT channel by selecting the second subset of the one or more PTT user client devices such that the second subset of the one or more PTT user client devices includes at least one PTT user client device whose physical location is further from the endpoint device than PTT user client devices of the first subset of the one or more PTT user client devices.

10. The apparatus of claim 8, wherein:

at least one PTT user of a client device of the second subset of the one or more PTT user client devices is a member of a second organizational group of the IP communication system.

11. The apparatus of claim 8, wherein the one or more processors are further configured to:

track telephone calls answered at an endpoint device of the IP communication system;

store tracking data in the one or more memories; and determine physical locations for endpoint devices based upon the tracking data.

12. The apparatus of claim 11, wherein the one or more processors are configured to track telephone calls answered at the endpoint device of the IP communication system by:

tracking the physical location of PTT user client devices of users who answer the telephone calls; and/or tracking times between PTT notifications of the telephone calls and answering of the telephone calls by the users.

13. The apparatus of claim 8 wherein the one or more processors are further configured to:

obtain, via the one or more network interfaces, an indication that the telephone call has not been answered by a user of a PTT client device in the first subset of the one or more PTT user client devices;
generate a second PTT audio notification; and
provide the second PTT audio notification to the first PTT channel, wherein the second PTT audio notification comprises one or more of:
an indication that the telephone call was missed;
an indication that a voicemail message was created in response to the telephone call; or
a replay of the first PTT audio notification.

14. The apparatus of claim 8 wherein the one or more processors are further configured to determine a purpose of the telephone call,
wherein the one or more processors are configured to generate the first PTT channel by generating the first PTT channel based on the purpose of the telephone call.

15. One or more tangible, non-transitory computer-readable storage mediums encoded with instructions, wherein the instructions, when executed by one or more processors, are configured to:
obtain, at one or more Push-To-Talk (PTT) processing devices of an Internet Protocol (IP) communication system, an indication that a telephone call is parked in the IP communication system;
determine, at the one or more PTT processing devices, a physical location of one or more PTT user client devices of the IP communication system;
determine an organizational group of a user of each of the one or more PTT user client devices of the IP communication system;
determine a first organizational group based upon the first organizational group being associated with where the telephone call is parked in the IP communication system;
generate, at the one or more PTT processing devices, a first PTT channel based upon the physical location of the one or more PTT user client devices, wherein the first PTT channel includes a first subset of the one or more PTT user client devices that belong to the first organizational group;
provide, from the one or more PTT processing devices to the first PTT channel, a first PTT audio notification that the telephone call is parked in the IP communication system; obtain, at the one or more PTT processing devices, an indication that the telephone call has not been answered by a user of a PTT client device in the first subset of the one or more PTT user client devices;
generate, at the one or more PTT processing devices, a second PTT channel based upon the physical location of the one or more PTT user client devices, wherein the second PTT channel includes a second subset of the one or more PTT user client devices that is different from the first subset of the one or more PTT user client devices; and
provide, from the one or more PTT processing devices to the second PTT channel, a second PTT audio notification that the telephone call is parked in the IP communication system.

16. The one or more tangible, non-transitory computer-readable storage mediums of claim 15, wherein the instructions are further operable to determine a purpose of the telephone call,
wherein the instructions operable to generate the first PTT channel comprise instructions operable to generate the first PTT channel based on the purpose of the telephone call.

17. The one or more tangible, non-transitory computer-readable storage mediums of claim 15, wherein the instructions operable to generate the first PTT channel comprise instructions operable to generate the first PTT channel based on a physical location of an endpoint device configured to answer telephone calls parked in the IP communication system; and
wherein the instructions operable to generate the second PTT channel further comprise instructions operable to select the second subset of the one or more PTT user client devices such that the second subset of the one or more PTT user client devices includes at least one PTT user client device whose physical location is further from the endpoint device than PTT user client devices of the first subset of the one or more PTT user client devices.

18. The one or more tangible, non-transitory computer-readable storage mediums of claim 15, wherein:
at least one PTT user of a client device of the second subset of the one or more PTT user client devices is a member of a second organizational group of the IP communication system.

19. The one or more tangible, non-transitory computer-readable storage mediums of claim 15, wherein the instructions are further operable to:
track telephone calls answered at an endpoint device of the IP communication system; and
determine a new physical location for the endpoint device based upon the tracking.

20. The one or more tangible, non-transitory computer-readable storage mediums of claim 19, wherein the instructions operable to track telephone calls answered at the endpoint device comprise instructions operable to:
track the physical location of PTT user client devices of users who answer the telephone calls; and/or
track times between PTT notifications of the telephone calls and answering of the telephone calls by the users.

* * * * *